Patented Mar. 25, 1952

2,590,086

UNITED STATES PATENT OFFICE 2,590,086

1-HYDROXY NAPHTHYL ALKANOIC ACIDS AND CERTAIN SALTS THEREOF

Robert R. Burtner, Skokie, Ill., assignor to G. D. Searle & Co., Skokie, Ill., a corporation of Illinois No Drawing. Application March 31, 1948, Serial No. 18,285

5 Claims. (Cl. 260—520)

This invention relates to carboxylic acids derived from α-naphthol, to salts thereof, and to methods of producing such acids. In particular it relates to carboxylic acids of the general structural formula

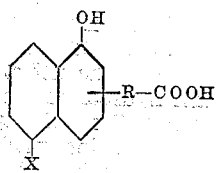

wherein R is a bivalent aliphatic radical and X is hydrogen or hydroxyl.

In the foregoing general structural formula R represents bivalent aliphatic radicals containing two to seven carbon atoms, such as lower alkylene radicals like ethylene, propylene, trimethylene, butylene and the like; R furthermore stands for unsaturated aliphatic hydrocarbon radicals, derived from the foregoing alkylene radicals by the introduction of one or more carbon-carbon double bonds, such as —CH=CH—,

and —CH=CH—CH$_2$—; R can also represent oxo-substituted alkylene radicals such as —CO—CH$_2$— and —CO—CH$_2$CH$_2$—, wherein an oxo group is substituted on the carbon atom of the alkylene radical adjacent to the naphthalene nucleus. As used herein the term alkylene radical stands for a bivalent radical derived from a saturated hydrocarbon, which may be straight- or branched-chained.

The compounds of this invention are useful in the preparation of complex organic compounds which are of value in the synthesis of steroids, dyestuffs, and pharmaceuticals. The compounds are also of value as antiseptics, antioxidants, pharmaceuticals, and insecticides. It is the object of this invention to provide useful substances for the foregoing purposes, as well as to provide efficient methods for their manufacture.

The compounds of the foregoing general structural formula, where R represents an alkylene radical, are prepared by reducing the corresponding keto acids or lower alkyl ethers of the corresponding keto acids, preferably by the Clemmensen method using zinc and hydrochloric acid. When the lower alkyl ethers of the keto acids are used subsequent to the reduction, the alkyl ethers are cleaved by the conventional methods, such as aluminum chloride, or heating in the presence of concentrated hydriodic or hydrobromic acids. In practice it has been found that the reduction is more efficiently carried out when an alkoxy keto acid is used than when a hydroxy keto acid is used. The reduction is preferably carried out in a heterogeneous medium wherein a solvent for the keto acid is employed, said solvent being immiscible in the aqueous reaction mixture. Generally, large excesses of zinc or amalgamated zinc and hydrochloric acid are employed, the exact proportions of these materials not being critical. In certain instances a homogeneous reaction mixture such as one obtained by use of a solvent such as glacial acetic acid is desirable.

Compounds of the foregoing structural formula, where R represents an unsaturated aliphatic radical, are produced by condensation of an aromatic aldehyde of the naphthalene series with an aliphatic acid anhydride in the presence of an alkaline salt of the corresponding aliphatic acid. Basic catalysts such as pyridine or piperidine may be used. Subsequent to the condensation reaction, the reaction mixture is subjected to saponification to cleave any esters of the free hydroxy radicals. Following this treatment the desired unsaturated acid can be isolated by acidification and purified by conventional procedures.

Compounds of the foregoing formula wherein R represents an oxyalkylene radical can be produced by reacting a compound of the formula

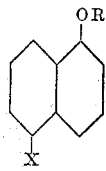

where R' is hydrogen or lower alkyl and X has the meaning given hereinabove, with an anhydride of a dibasic aliphatic acid or with a carbalkoxy alkanoyl halide in the presence of a Friedel-Crafts catalyst such as anhydrous aluminum chloride, anhydrous ferric chloride, stannic chloride, anhydrous zinc chloride, boron trifluoride, hydrogen fluoride, and related compounds in a solvent which has lower reactivity than the hydroxy or alkoxy naphthalene. Among such solvents are nitrobenzene, carbon disulfide, tetrachloroethane, chlorobenzene, and similar solvents. Subsequent to the condensation, quenching of the reaction mixture and removal of solvent, the product is dissolved in alkali, and the desired keto acid can be obtained in relatively pure form by acidification of the alkaline solution. Among the acid anhydrides which can be used in my process to prepare substances to which this invention pertains are succinic, glutaric, adipic, pimelic, and subaric, as well as alkylated derivatives of dibasic acids such as pyrotartaric, ethyl succinic, methyl adipic, and related acids.

Salts of the keto acids to which this invention relates may be obtained by neutralization of the acids with organic or inorganic bases such as sodium carbonate, sodium hydroxide, potassium bicarbonate, calcium hydroxide, ammonium hydroxide and ammonium carbonate; methylamine, dimethylamine, ethylamine, and related mono-, di- and tri-alkylamines; alkanolamines such as ethanolamine, isopropanolamine, triethanolamine, diethylaminoethanol; and strong heterocyclic amines which are aliphatic in character, including morpholine, piperidine, and related substances.

Alkaline salts of these acids may be prepared by solution of the acid in an alkaline carbonate solution, such as sodium carbonate, followed by salting-out with a salt, as for example sodium chloride. Likewise such salts may be prepared by treatment of an alcoholic solution of the acid with an alcoholic solution of alkali. The salts are often insoluble in alcohol and may be obtained as precipitates. In other cases another solvent such as ether or benzene may be added to throw down the salt. Salts of aliphatic amines may be obtained by treating a solution of the acid in an organic solvent with a solution of the amine in a similar solvent and precipitating the desired salt with another miscible solvent in which the salt is insoluble.

My invention is further disclosed by means of the following examples, which are set forth for the purpose of illustration and which in no way are to be construed as limiting my invention in spirit or in scope. It will be apparent to those skilled in the art that innumerable conventional modifications in solvent, temperature, catalyst and reagents can be adopted without departure from the intent and purpose of this invention. For example, the keto acids of Examples 1 and 2 may be reduced by hydrazine by the general Wolff-Kishner method or the keto groups may be reduced by catalytic hydrogenation. Quantities of materials are given in parts by weight unless otherwise noted.

*Example 1*

200 parts of mossy zinc are amalgamated by agitation for 5 minutes in a solution of 20 parts of mercuric chloride, 12 parts of concentrated hydrochloric acid, and 300 parts of water. The aqueous solution is removed by decantation, and to the amalgamated zinc are added 150 parts of water, 415 parts of concentrated hydrochloric acid, 8 parts of glacial acetic acid, and 165 parts of toluene. To this mixture are then added 98 parts of β-(4-methoxy-1-naphthoyl)propionic acid (Burtner and Brown application Serial No. 780,572, filed October 17, 1947, now abandoned and abstract published at 634 O. G. 312, May 2, 1950) and the resulting mixture is refluxed. At the end of 6, 12, and 18 hours 120-part portions of concentrated hydrochloric acid are added. After 30 hours, the reaction mixture is cooled to room temperature and filtered. The toluene layer is removed and the aqueous layer is extracted twice with toluene. The combined toluene solutions are mixed with a solution of 64 parts of sodium hydroxide in 640 parts of water. The toluene is removed by steam distillation and the aqueous residue is cooled to about 80° C. 67 parts of dimethyl sulfate are added and the mixture is agitated for 30 minutes at 80° C. After standing overnight, the mixture is neutralized (acid to phenolphthalein and basic to litmus) with dilute sulfuric acid. A small amount of gummy solid is removed by filtration and the clear filtrate is made strongly acid with dilute sulfuric acid. A dark yellow precipitate of γ-(1-methoxy-4-naphthyl)butyric acid forms. This granulates on standing. It is removed by filtration, washed and dried. This acid is refluxed for 6 hours in 270 parts of absolute ethanol containing 32 parts of concentrated sulfuric acid. About ⅔ of the solvent is evaporated under reduced pressure, and the residue is poured into 700 parts of ice and water. The mixture is then extracted twice with ether and the ether extract is washed with dilute sodium carbonate solution and water. After drying, the ether is stripped off and the residue of ethyl γ-(1-methoxy-4-naphthyl)butyrate is distilled under reduced pressure. It boils at 180–191° C. at 1.4 millimeters pressure.

333 parts of ethyl γ-(1-methyl-4-naphthyl)-butyrae are saponified by refluxing for 1.5 hours in 800 parts of ethanol containing 168 parts of potassium hydroxide. The ethanol is stripped off under reduced pressure. The solid residue is dissolved in 1000 parts of water at 60° C. The aqueous solution is treated with decolorizing charcoal, filtered, and the filtrate is added to an excess of dilute hydrochloric acid. The precipitate of γ-(1-methoxy-4-naphthyl)butyric acid is collected on a filter, washed and dried. It is dissolved in warm benzene, treated with decolorizing charcoal, filtered, and diluted with approximately an equal volume of petroleum ether. On chilling, crystals of γ-(1-methoxy-4-naphthyl)butyric acid separate. These melt at 127–128° C.

1 part of γ-(1-methoxy-4-naphthyl)butyric acid and 16.6 parts of hydriodic acid (specific gravity 1.66) are refluxed for 10 minutes. The hot solution is poured into 50 parts of cold water. A precipitate γ-(1-hydroxy-4-naphthyl)-butyric acid rapidly granulates. It is removed by filtration, washed and dried at 65° C. Recrystallization from boiling water gives colorless crystals of γ-(1-hydroxy-4-naphthyl)butyric acid melting at 147–148° C. This acid has the following structural formula

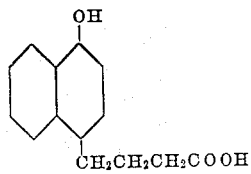

By a similar reduction of δ-(1-methoxy-4-naphthoyl)-valeric acid (Burtner and Brown application Serial No. 780,572, filed October 17, 1947, published at 634 O. G. 312, May 2, 1950) with zinc amalgam according to the above procedure, there is produced ω-(1-methoxy-4-naphthyl)-caproic acid. This acid, after demethylation with hydriodic acid by the foregoing method, gives rise to ω-(1-hydroxy-4-naphthyl) caproic acid, having the formula

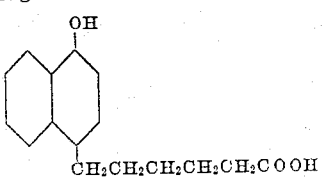

*Example 2*

25.5 parts of β-(4-hydroxy-1-naphthoyl)-α-methyl-butyric acid (Burtner and Brown application Serial No. 780,572, filed October 17, 1947, published at 634 O. G. 312, May 2, 1950) and 50 parts of zinc amalgam, prepared as in Example 1, are refluxed in 40 parts of water containing 55 parts of concentrated hydrochloric acid, 2 parts of glacial acetic acid and 45 parts of toluene. At the end of 6, 12 and 18-hour periods there are added 30-part portions of acid. After 24 hours the mixture is cooled, filtered and separated. The aqueous phase is extracted with toluene and the toluene solutions are combined and mixed with 175 parts of 10% caustic soda solution. The toluene is steam distilled and the warm alkaline layer is methylated with 15 parts of dimethyl sulfate. After neutralization with sulfuric acid the solution is filtered and then made strongly acid. The precipitate of γ-(4-hydroxy-1-naphthyl)-α-methylisovaleric acid is separated, washed and dried. It has the formula

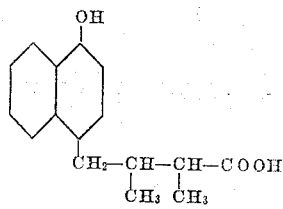

By a similar process, using 23 parts of β-(1-hydroxy-2-naphthoyl)propionic acid (Burtner and Brown application Ser. No. 780,572, filed October 17, 1947, published at 634 O. G. 312, May 2, 1950) with 50 parts of zinc amalgam by the method of Example 1 there is obtained γ-(1-hydroxy-2-naphthyl)butyric acid, which has the formula

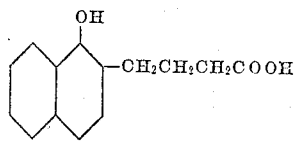

*Example 3*

A mixture of 25 parts of 1-hydroxy-4-naphthaldehyde, 25 parts of freshly fused sodium acetate, 125 parts of acetic anhydride and 0.3 part of pyridine is heated at 160–165° C. for 9 hours under a reflux condenser. The mixture is cooled and quenched in 500 parts of cold water. The resulting solution is agitated and heated to about 60° C. for ½ hour; and then chilled. The precipitate of crude β-(1-hydroxy-4-naphthyl)-acrylic acid is separated by decantation and dissolved in 100 parts of hot alcohol. The hot alcoholic solution is added to 2000 parts of water containing 12 parts of sodium hydroxide. The resulting mixture is agitated for 10 minutes, and then filtered. The filtrate is saturated with carbon dioxide and the sand-colored precipitate is removed by filtration. This is chiefly unchanged hydroxynaphthaldehyde. The resulting filtrate is treated with decolorizing charcoal, filtered, and then acidified. The precipitate of β-(1-hydroxy-4-naphthyl) acrylic acid is removed by filtration, washed, and dried at 65° C. The product so obtained melts and decomposes simultaneously at about 132–133° C. It has the following structural formula

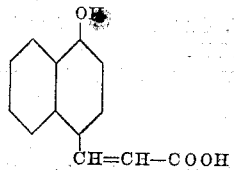

By catalytic hydrogenation of the above acid, in the presence of a nickel or noble metal catalyst, there is formed β-(1-hydroxy-4-naphthyl) propionic acid of the formula

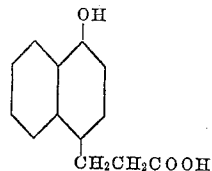

*Example 4*

By condensing 1-hydroxy-2-naphthaldehyde with sodium acetate and acetic anhydride by the general method of Example 3, there is produced β-(1-hydroxy-2-naphthyl)-acrylic acid, having the formula

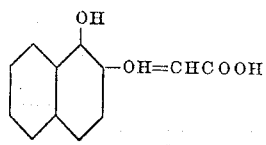

This acid may also be converted by hydrogenation to β-(1-hydroxy-2-naphthyl)propionic acid, which has the formula

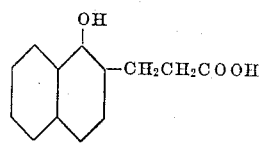

*Example 5*

188 parts of 1,5-dimethoxynaphthaline and 100 parts of succinic anhydride are suspended in 1600 parts of dry tetrachloroethane. The suspension is chilled to 5° C. and 267 parts of anhydrous aluminum chloride are added. The mixture is agitated for 1 hour at 0–5° C. and then for 48 hours at room temperature. The mixture is quenched by pouring into 2000 parts of ice containing 400 parts of concentrated hydrochloric acid. The solvent is removed by steam distillation and the granular precipitate of β-(1,5-dimethoxy-4-naphthoyl)-propionic acid is removed by filtration. This material is pulverized and then dissolved in 5000 parts of boiling water containing 120 parts of sodium hydroxide. The hot solution is filtered and the filtrate is acidified. The precipitate of purified β-(1,5-dimethoxy-4-naphthoyl)propionic acid is removed by filtration, washed with water, and dried at 65° C. It melts at 171–172° C. after recrystallization from isopropanol.

10 parts of finely powdered β-(1,5-dimethoxy-4-naphthoyl)propionic acid and 100 parts of tetrachloroethane are agitated and 20 parts of anhydrous aluminum chloride are added. The temperature rises to about 45° C. during the agitation. The mixture is then heated and agitated at 60° C. for 20 minutes. It is then poured into ice containing 24 parts of concentrated hydrochloric acid. The solvent is removed by steam distillation and the residue is chilled. A bright yellow crystalline precipitate of β-(1,5-dihydroxy-4-naphthoyl)propionic acid separates. This is removed by filtration, washed with cold water, and dried. After recrystallization from 15% alcohol in the presence of decolorizing charcoal, the acid melts at 168–169° C. with decomposition. By further recrystallization from 50% acetic acid, employing activated charcoal, dark yellow crystals melting at about 176° C. (with decomposition) are obtained. A mixed melting point with β-(1,5-dimethoxy-4-naphthoyl) propionic acid was 150–155° C. β-(1,5-dihydroxy-4-naphthoyl)propionic acid has the following structural formula

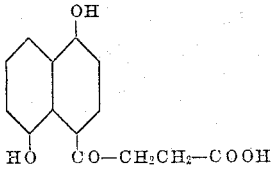

*Example 6*

By the condensation of 32 parts of adipic anhydride with 47 parts of 1,5-dimethoxynaphthalene in 400 parts of dry tetrachloroethane in the presence of 67 parts of anhydrous aluminum chloride at 0–5° C., according to the general method of Example 5, there is obtained ω-(1,5-dimethoxy - 4 - naphthoyl)valeric acid. This acid can be demethylated with anhydrous aluminum chloride in tetrachloroethane by the foregoing process to form ω-(1,5-dihydroxy-4-naphthoyl)caproic acid, which has the formula

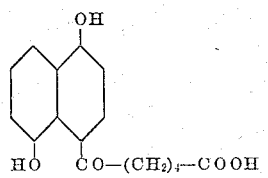

*Example 7*

370 parts of zinc are amalgmated as in Example 1. To the zinc amalgam are added 200 parts of acetic acid and 40 parts of β-(1,5-dimethoxy-4-naphthoyl)propionic acid (Example 5). The mixture is warmed to about 85° C. and 236 parts of concentrated hydrochloric acid are added in three portions with agitation over 5 minutes. After the initial exothermic reaction subsides the mixture is agitated and refluxed for 6 hours. After 2 hours and after 4 hours 44 parts of acid are added. The hot liquor is decanted and quenched in 3000 parts of cold water. The residue of zinc is washed with 80 parts of alcohol and the wash liquor is added to the quenched mixture. A gummy precipitate settles out on standing. This is separated and taken up in 1000 parts of hot water containing 12 parts of caustic soda. The hot solution is treated with activated charcoal and filtered. To the warm filtrate are added 51 parts of caustic soda and 63 parts of dimethyl sulfate. The mixture is agitated at 80–85° C. for 1.5 hours. The cooled mixture is then filtered and crystals of sodium γ-(1,5-dimethoxy-4-naphthyl)butyrate are removed by filtration. These are dissolved in 500 parts of boiling water, cooled, filtered and then acidified. The white precipitate of γ-(1,5-dimethoxy-4-naphthyl)butyric acid is filtered off, washed and dried at 650° C. After recrystallization from benzene the acid melts at about 155° C. It forms by esterification in methanol containing about 4% of sulfuric acid methyl γ-(1,5-dimethoxy-4-naphthyl)butyrate which distils at about 153° C. at 0.4 mm. pressure.

5 parts of γ-(1,5-dimethoxy-4-naphthyl)butyric acid in 90 parts of hydriodic acid (specific gravity 1.7) are demethylated according to the process of Example 1. There is thus obtained γ - (1,5 - dihydroxy - 4 - naphthyl)butyric acid, which has the formula

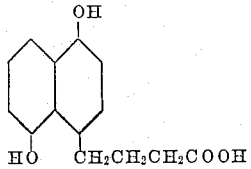

I claim:
1. γ-(1-hydroxy-4-naphthyl)butyric acid.
2. An acid having the structural formula

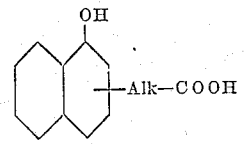

wherein Alk is an alklene radical containing from two to seven carbon atoms.
3. An acid having the structural formula

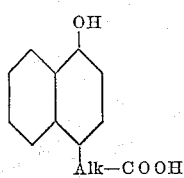

wherein Alk is an alkylene radical containing from two to seven carbon atoms.
4. An acid having the structural formula

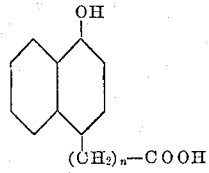

wherein $n$ is an integer from 2 to 7.
5. A member of the group consisting of an acid and salts threreof, said acid having the formula

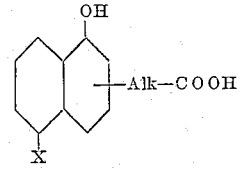

wherein X is a member of the group consisting of hydrogen and hydroxyl radicals and Alk is an alkylene radical containing at least two and not more than seven carbon atoms.

ROBERT R. BURTNER.

REFERENCES CITED

The following references are of record in the file of this patent:

UNITED STATES PATENTS

| Number | Name | Date |
|---|---|---|
| 2,400,433 | Natelson et al. | May 14, 1946 |

OTHER REFERENCES

Dey et al., J. Chem. Soc. (London), vol. 125, pp. 563–564 (1924).

Beilstein (Handbuch, 4th Ed.), vol. 10, p. 341 (1927).

Gulati et al., J. Chem. Soc. (London), vol. 1936, pp. 267–269.

Desai et al., Chem. Abstracts, col. 3038 (1937).